Feb. 2, 1932. D. LAKENBACH Re. 18,346

HAIR WAVING MEANS

Original Filed June 26, 1928

Inventor:
Daniel Lakenbach
by Upson & Finkelstein
Attorney

Reissued Feb. 2, 1932

Re. 18,346

UNITED STATES PATENT OFFICE

DANIEL LAKENBACH, OF NEW YORK, N. Y.

HAIR WAVING MEANS

Original No. 1,716,067, dated June 4, 1929, Serial No. 288,349, filed June 26, 1928. Application filed for reissue filed October 17, 1930. Serial No. 489,469.

The present invention relates to a device for waving hair, whereby a wave or curl, commonly known as a permanent wave, may be imparted to the hair upon the human head.

In the art of permanent hair waving it is the practice to wind a lock of hair tightly upon a curler, usually a metallic rod, and then wind about the curled hair a strip of absorbent material which has been impregnated with a fluid commonly used in the art of hair waving, and to enclose the said strip by a moisture-proof and non-heat conducting material so that, when the curled hair and the absorbent material are subjected to the action of heat, steam will not escape through the enclosing jacket nor will the absorbent material take fire, should it be subjected to excessive heat. In order to prevent the escape of steam adjacent the scalp, clips have been used heretofore for closing the protecting jacket, but their used has been found to be objectionable mainly on the ground that in applying the same to the jacket and particularly in removing the same therefrom a pull is exerted on the hair which renders the waving operation rather painful. In addition, these clips are made of metal, so that additional protecting means must be used to prevent their coming into contact with the scalp.

The main object of the present invention is to provide a device of the character mentioned which is free from the objections stated in that it does away entirely with the use of the metallic closing clips and yet provides an air-tight jacket around the curled hair and thereby greatly improves the waving operation.

Another object of the invention is to provide a hair waving appliance of the character mentioned which is simple in construction, efficient in operation and capable of manufacture on a commercial scale, or in other words one which is not so difficult to produce as to be beyond the reasonable cost of such a contrivance.

With these and other objects in view, which will more fully appear as the nature of the invention is better understood, the same consists in the combintion, arrangement and construction of parts hereinafter described, pointed out in the appended claims and illustrated in the accompanying drawings, it being understood that many changes may be made in the size and proportion of the several parts and details of construction within the scope of the appended claims, without departing from the spirit or sacrificing any of the advantages of the invention.

One of the many possible embodiments of the invention is illustrated in the accompanying drawings, in which:—

Figure 1:
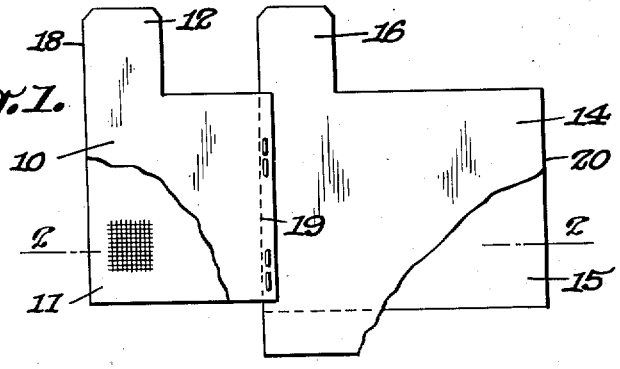
Fig. 1 is an elevation of the improved device.
Figure 2:
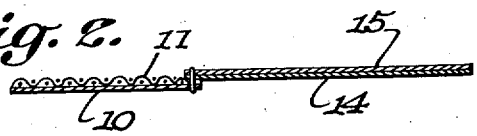
Fig. 2 is a section taken on line 2—2 of Fig. 1.

In the drawings, the numeral 10 indicates a strip of absorbent material, such as blotting paper or felt, which is saturated with a hair treating substance, of which usually borax is the principal constituent. This absorbent material is provided with a backing 11 of a relatively coarse-meshed material, such as cheese cloth, bandage material or cloth of a like nature. The absorbent material 10 and its backing 11 are provided with overlying tabs 12 and 13, respectively, for a purpose hereinafter to be described. The strip 10 and its backing 11 are attached in any suitable manner, for instance by means of stitches to a substantially water-proof sheet 14, for instance impregnated paper, which is provided with a backing 15 of fireproof material, for instance tinfoil. The sheet 14 and its backing are also provided with overlying tabs, denoted by the numerals 16 and 17, respectively, the last-mentioned tabs being in alignment with the tabs 12 and 13 above referred to. The tab 12 of the strip 10 extends from the front edge 18 of the said strip toward its attached edge, and the tab 16 of the sheet 14 extends from the attached edge 19 thereof toward its free edge 20.

Figure 3:
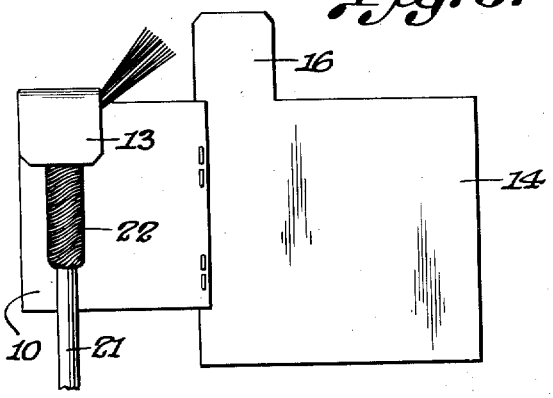
Fig. 3 is a view similar to the one shown in Fig. 1 of the drawings, showing a curler in operative relation thereon and a portion of the device folded against the said curler.
Figure 4:
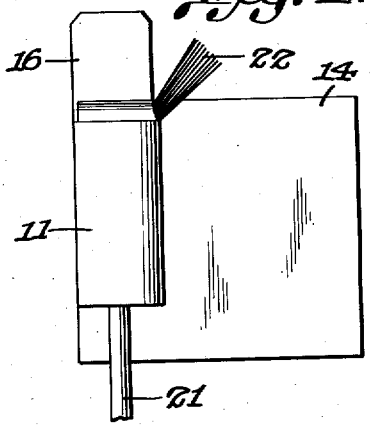
Figs. 4 and 5 are similar views with the elements in other positions.
Figure 5:
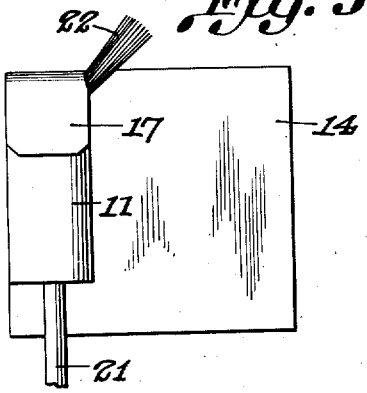
Figure 6:
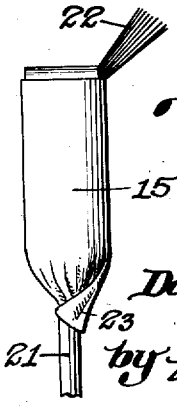
Fig. 6 is an elevation of the device showing the same wrapped around a lock of hair upon a curler before the said lock and curler are positioned in a heater.

In using the device, the curler rod 21, with a hair lock 22 wound thereon, is placed upon the strip 10 in registering position with the tabs 12 and 13, and the latter are then folded onto the said curler rod and lock, as shown in Fig. 3 of the drawings. Thereafter the strip 10 and its backing 11 are rolled about the curler rod and lock, the rolling operation beginning with the edge 17 of the strip 10 until the said strip and its backing completely cover the wound hair, the elements being then in the positions shown in Fig. 4 of the drawings, from which it appears that the tabs 16 and 17 are in registering positions with the partially rolled up device. The tabs 16 and 17 are thereupon folded upon the roll, as shown in Fig. 5 of the drawings, and thereafter the rolling operation is continued until the sheet 13 and its backing 14 completely cover the strip 10 and its backing 11, whereby the said strip is surrounded by a tubular casing of fire-proof material. The lower end of the roll is then twisted about the curler rod 21, as shown at 23, after which an electric heater may be positioned upon the roll containing the lock of hair. The tabs of the device, being folded upon the lock of hair, provide a substantially air-tight closure, and prevent escape of steam and moisture from the roll during the heating operation adjacent the scalp.

It is obvious that, while herein an impregnated strip and backing of specific materials have been described, and a water-proof sheet and backing of a particular type have been disclosed, any other materials may be used without departing from the invention, which lies mainly in the provision of the tabs mentioned for the purpose of providing an air-tight closure for that end of the hair lock jacket which is adjacent the scalp. Attention is, however, called to the fact that it is desirable that the tinfoil sheet 15 should be so heavy or thick that it prevents unrolling of the jacket when the elements have once been rolled upon the lock of hair.

What I claim is:—

1. A device of the class described, comprising an absorbent strip containing hair treating material, a backing strip for said first mentioned strip, said strips being flexible so that they may be wrapped around a lock of hair upon a curler, a sheet of waterproof material, a sheet of fireproof backing for said waterproof material, means for attaching said strips to said sheets, said sheets being adapted to be wrapped around said strips after the latter have been rolled upon the lock of hair upon a curler so as to form a cylindrical covering for said strips, overlying tabs upon said strips, and overlying tabs upon said sheets, said tabs being adapted to be folded upon the lock of hair and upon said strips, respectively, before the rolling operation is commenced.

2. A device of the class described, including a flexible absorbent strip containing hair treating material adapted to be wrapped around a lock of hair upon a curler, a sheet of water-proof material attached to said strip, said sheet being adapted to be wrapped around said strip after the latter has been rolled upon the lock of hair on a curler so as to form a cylindrical covering for said strip, registering tabs upon said strip and sheet, the tab upon said strip being adapted to be folded upon the lock of hair before the rolling operation is commenced and the tab on said sheet being adapted to be folded upon said strip after the latter has been rolled upon the lock of hair and before said sheet is wrapped around said strip.

3. A hair waving device comprising a strip of flexible absorbent sheet material adapted to be wrapped around a lock of hair on a curler rod, and an integral tab extending outwardly from said strip adapted to be folded over one end of said rod and retained in folded position only by said wrapped strip to form a pocket for said end of said rod.

4. In combination, a curler rod and a hair waving device comprising a strip of flexible absorbent sheet material wrapped around said curler rod and an integral tab normally extending outwardly from said strip and folded over an end of said rod and retained in folded condition only by said wrapped strip to form a pocket for said end of said curler rod.

5. A hair waving device comprising an absorbent strip of flexible sheet material adapted to be wrapped around a lock of hair on a curler rod, a sheet of waterproof material attached to said strip and adapted to be wrapped around said strip after the latter has been rolled upon the rod to form a cylindrical covering for said strip, and an extension upon said strip adapted to be folded over the end of the rod to form a pocket for said end upon wrapping said strip and sheet.

6. A hair waving device comprising an absorbent strip of flexible sheet material adapted to be wrapped around a lock of hair on a curler rod, a sheet of waterproof material attached to said strip and adapted to be wrapped around said strip after the latter has been rolled upon the rod to form a cylindrical covering for said strip, an extension upon said strip adapted to be folded over the end of the rod to form a pocket for said end upon wrapping said strip, and an extension on said sheet adapted to be folded over said first folded extension upon wrapping said sheet.

7. A hair waving device comprising, in combination, a rectangular strip of absorbent sheet material containing hair treating substance adapted to be wrapped around a lock of hair upon a curler rod, and an integral tab extending from one end of said strip and adjacent one side edge of the said strip, adapted to be folded over the end of said curler rod to form a pocket for said end of said rod upon wrapping said strip about said rod and folded tab.

8. In a hair waving device, in combination, a strip of absorbent sheet material containing hair treating material, a tab extending from one end of said strip, and adjacent one side edge of said strip and a sheet of waterproofing material attached to the opposite side edge of said strip and extending therefrom.

9. In a hair waving device, in combination, a strip of absorbent sheet material containing hair treating material, a tab extending from said strip, a sheet of waterproofing material attached to said strip, and a tab extending from said sheet.

10. In a hair waving device, in combination, a strip of absorbent sheet material containing hair treating material, a tab extending from said strip, a sheet of waterproofing material attached to said strip, a tab extending from said sheet, and a sheet of fireproof material superimposed on said waterproof sheet and tab to form a backing therefor.

Signed at New York city, the 17 day of June, 1931.

DANIEL LAKENBACH.